United States Patent [19]

Hoag et al.

[11] Patent Number: 5,712,936
[45] Date of Patent: Jan. 27, 1998

[54] HYBRID BI-DIRECTIONAL THREE COLOR WAVE DIVISION MULTIPLEXER AND METHOD USING SAME

[75] Inventors: Mark Hoag; David Keiser, both of Garland, Tex.

[73] Assignee: MCI Communications Corporation, Washington, D.C.

[21] Appl. No.: 762,035

[22] Filed: Dec. 9, 1996

Related U.S. Application Data

[63] Continuation of Ser. No. 671,183, Jun. 27, 1996, abandoned.

[51] Int. Cl.⁶ .................. G02B 6/28; H04J 14/02
[52] U.S. Cl. .................. 385/24; 385/15; 385/16; 385/31; 385/39; 385/42; 385/44; 385/46; 359/114; 359/115; 359/124; 359/127
[58] Field of Search .................. 385/14, 15, 16, 385/17, 24, 27, 31, 39, 42, 44, 46, 49, 50, 140; 359/115, 116, 117, 124, 127, 128, 188, 195, 114

[56] References Cited

U.S. PATENT DOCUMENTS

| | | | |
|---|---|---|---|
| 4,483,582 | 11/1984 | Sheem | 385/47 X |
| 4,705,350 | 11/1987 | Cheng | 385/24 |
| 4,726,644 | 2/1988 | Mathis | 385/46 X |
| 4,889,404 | 12/1989 | Bhagavatula et al. | 385/24 X |
| 5,000,530 | 3/1991 | Takahashi | 385/24 X |
| 5,043,975 | 8/1991 | McMahon | 359/128 |
| 5,050,952 | 9/1991 | Fussgager | 385/24 X |
| 5,064,263 | 11/1991 | Stein | 385/24 X |
| 5,069,521 | 12/1991 | Hardwick | 385/24 |
| 5,071,214 | 12/1991 | Jacob et al. | 385/24 X |
| 5,208,692 | 5/1993 | McMahon | 359/128 |
| 5,245,404 | 9/1993 | Jannson et al. | 385/37 X |
| 5,278,927 | 1/1994 | Birk | 385/46 |
| 5,361,157 | 11/1994 | Ishikawa et al. | 385/46 X |

OTHER PUBLICATIONS

"MCI Deploys Technology Capable of Increasing Network Capacity by Fifty Percent Without New Fiber," *MCI Press Release*, Aug. 30, 1995.
Rendleman, J., "MCI Adding Optical Gear to Boost Net," *Wan Services & Equipment*, p. 87, Sep. 11, 1995.
"MCI Hopes to Boost Network Capacity 50% Through New Method", *The Wall Street Journal*, p. B11, Aug. 31, 1995.

*Primary Examiner*—Brian Healy

[57] ABSTRACT

A hybrid, bi-directional, three-color, wave-division multiplexer (HB3-WDM), fiber optic communication system employs a combination of wide band and narrow band WDMs to multiplex three pairs of optic signals over two fiber optic cables. The three pairs of signals include two pairs in a range centered about 1550 nm and one pair in a range centered about 1330 nm. In one embodiment, modularized HB3-WDMs are used to modify a pre-existing, multi-cable, bi-directional, two-color WDM system. The modified system communicates thirty percent more data while maintaining pre-existing signal attenuation levels and pre-existing back-up capabilities.

26 Claims, 11 Drawing Sheets

HYBRID BI-DIRECTIONAL THREE COLOR WAVE DIVISION MULTIPLEXER AND METHOD USING SAME

This application is a continuation of application Ser. No. 08/671,183, filed Jun. 27, 1996, now abandoned.

BACKGROUND OF THE INVENTION

1. Field of the Invention

The present invention relates generally to fiber optic communications systems and, more particularly, to fiber optic communications systems which employ hybrid, bi-directional, three-color wave division multiplexers (HB3-WDMs).

2. Related Art

Fiber optic communications systems are widely used in the telecommunications industry for communicating both voice and data information. A typical fiber optic communication system includes a plurality of fiber optic cables extending between at least two communications sites. Optical-electronics hardware is included at each site for transmitting and receiving optical signals over the fiber optic cables. One of these sites may be the originating source or final destination of one or more of the signals. Alternatively, one of the sites may simply serve as an amplification station between other sites. Because of signal attenuation in the fiber optic cables, due to scattering and other phenomenon, these sites must generally be located within 45 km of each other. Frequently, at least one fiber optic cable and its associated optical-electronics hardware are reserved as a spare, or back-up, system. In the event that there is a failure in a primary cable system, the spare system is used for transmitting and receiving signals normally carried by that primary cable.

Fiber optic communications systems are typically bi-directional. That is, for each signal transmitted, there is a corresponding receive signal. In this way, two-way communications is possible. One way to achieve this bi-directional capability is to have each individual fiber optic cable communicate a bi-directional signal pair. That is, for each optic signal traveling in one direction on a particular fiber, a corresponding signal travels in the other direction on that same fiber. Such a signal pair would typically constitute one transmit/receive pair for a given site. Fiber optic cables used in transmission systems are often single mode fibers. In bi-directional, single mode, fiber optic cable systems, transmit/receive pairs are coupled onto fiber optic cables by wave-division multiplexers (WDMs) or other optical multiplexing devices. A variety of such devices are taught in U.S. Pat. No. 5,452,124, issued to Baker, and in U.S. Pat. No. 5,491,764, issued to Hu, et al. Both of these references are hereby incorporated by reference, in their entirety.

In order to permit these multiplexing devices to distinguish between transmit and receive signals, each signal is transmitted at a distinct wavelength. A communications system employing such a two-wavelength transmit/receive pair is a called a two-color system.

Due to dispersion and other optical effects, fiber optic communications systems are generally limited to operation in just two ranges of wavelength. These ranges are centered about 1310 nm and 1550 nm. Within each of these two ranges, however, a number of distinct wavelengths may be employed in a fiber optic communications system.

A variety of WDMs are available for use in a fiber optic communications system, the choice of which will depend upon the combination of wavelengths employed in a system. Wide band WDMs, for instance, can be used to multiplex a 1310 nm range signal and a 1550 nm range signal. Narrow band WDMs, on the other hand, can only be used to multiplex signals within a particular wavelength range, such as 1300 nm to 1320 nm or 1530 nm to 1565 nm.

Multiple WDM can be employed to multiplex multiple signals onto a particular cable. Each WDM, however, adds attenuation to the system. Attenuation meaning a reduction in signal strength or power. Wide band WDMs, for instance, add up to 1.5 db of attenuation and narrow band WDMs add up to 2 db of attenuation. In addition to WDM attenuation, fiber optic cables themselves add attenuation to the signals. Typically, for a 45 km fiber optic cable, a 1310 nm range signal will be attenuated by as much as 5 db more than a 1550 nm range signal on the same fiber path. This is an inherent characteristic of single mode fiber. These attenuation factors must be taken into account by designers. Frequently, this requires the addition of attenuation devices in one or more signal paths to bring all signals in a given system to a standard level. In this way, receivers and WDMs can be designed around this standard signal level.

As demand for telecommunications rises, so to does the demand for increased fiber optic transmission capability. Although existing single mode fiber optic cables have the ability to communicate more signals at a higher speed or bit rate than is currently utilized, existing systems are limited by the optical-electronics devices which they employ. As a result, increasing the amount of data transmitted generally requires the addition of fiber optic cables. Adding fiber cable, however, can be very expensive, currently estimated at $100,000 per mile.

One alternative to adding additional fiber cables is to design new optical-electronic hardware for increasing the speed at which data streams are sent over existing cables. While such a solution is desirable, the necessary hardware may not be currently available, or is cost prohibitive, for field installation.

Another alternative is to increase the number of signals transmitted on existing fiber optic cables. Until now, however, design of such a system has been plagued with attenuation problems caused by scattering and other phenomenon. Moreover, because existing systems include a certain number of back-up systems, additional signals may require additional back-up systems.

There is a need, therefore, for an immediate, yet inexpensive, system to increase the amount of data which can be transmitted over long distances of existing fiber optic cables. Such a system must not compromise existing spare back-up capabilities nor add unwanted attenuation to the system. Such a system should employ a substantial portion of existing hardware in order to further limit costs.

SUMMARY OF THE INVENTION

The present invention is directed toward a system and method of increasing data flow over fiber optic communications cables.

One advantage of the present invention is that it increases data flow without increasing the number of fiber optic cables.

Another advantage of the present invention is that it increases the number of bi-directional signals carried by a fiber optic cable, without adding additional signal attenuation to the system.

A further advantage of the present invention is that it is implemented with currently available optical-electronic hardware and configurations.

Still a further advantage of the present invention is that it can be implemented as a plug-and-play modification kit to existing systems.

Still a further advantage of the present invention is that it is implemented without compromising accepted levels of back-up protection.

In a preferred embodiment, hybrid bi-directional three-color WDMs (HB3-WDMs) are employed to communicate three pairs of bi-directional signals over two fiber optic cables. A hybrid bi-directional three-color WDM is a wave division multiplexer which employs a combination of narrow band and wide band WDM devices (hence "hybrid") in order to multiplex three optical signals of different wavelengths (hence "three-color") onto a single fiber optic cable. More particularly, in the preferred embodiment, a first two-color bi-directional signal pair is multiplexed on a first fiber optic cable by a first HB3-WDM. In addition, a first signal of a one-color bi-directional signal pair is also multiplexed onto the first fiber optic cable by the first HB3-WDM. In order to permit the HB3-WDM to distinguish between each of the three signals, the first signal of the one-color signal pair must have a wavelength which is different than either of the signals of the two-color pair of signals.

On a second fiber optic cable, a second two-color bi-directional signal pair is multiplexed by a second HB3-WDM. A second signal of the one-color bi-directional signal pair is also multiplexed on the second fiber optic cable by the second HB3-WDM. As in the first cable, in order to permit the HB3-WDM to distinguish between each of the three signals, the second signal of the one-color signal pair must have a wavelength which is different than either of the signals of the two-color pair of signals.

As described, the first optic cable has three signals, two from the first two-color pair and one from the one-color pair. The second optic cable also has three signals, the remaining one of the one-color pair and the second two-color pair. Between the first and second cables, therefore, there are a total of six signals or three pairs of transmit/receive signals.

In the preferred embodiment, a first signal of both the first and second two-color signal pairs is in the range of 1310 nm. A second signal of the first and second two-color signal pairs is in the wide-band range of 1550 nm. In addition, both signals of the one-color signal pair are in the narrow-band range of 1550 nm.

In the preferred embodiment, the HB3-WDM are designed so that the 1310 nm range signals are subjected to no more attenuation than they would have been subjected to in an existing two-color wide-band system. The 1550 nm range signals, on the other hand, are subjected to approximately 4 db of attenuation above that which they would have been subjected to in a typical two-color wide-band system.

Recall, however, that in a 45 km fiber optic cable, a 1310 nm range signals is attenuated about 5 db more than a 1550 nm range signal. In a typical two-color system using a 1310 nm range signal and a 1550 nm range signal, therefore, additional attenuation is added to the 1550 nm range signal in order to reduce its signal strength to that of the 1310 nm range signal. In this way, receivers, WDMs and other devices can be designed around a common signal level.

In the preferred embodiment, because of the attenuation added to the 1550 nm range signals by the HB3-WDM, there is no longer a need for additional attenuation in the 1550 nm range signals. Instead the various 1310 nm and 1550 nm attenuation factors maintain the signals at relatively even levels. By taking advantage of natural differences in signal attenuation, therefore, the HB3-WDM system permits an additional signal to be modulated on a fiber optic cable without lowering any of the signal strengths below that which would have existed in a two-color system. HB3-WDM systems can therefore, employ existing transmitters, receivers, fiber optic cables and test equipment without modification. Thus, a substantial increase in data transmission (30%) is achieved without redesigning existing transmitters, receivers or optic cables.

In an alternative embodiment, the present invention is installed as a "plug-and play" modification to a pre-existing, multi-cable, two-color per cable, bi-directional fiber optic communication system. In the pre-existing system, one signal is in the 1310 nm range and the other is in the 1550 nm range. The modification is performed on each cable in the system one cable at a time. During the modification to a particular cable, the signal pair normally communicating on that cable is routed to a back-up spare system.

More specifically, in the modification, a two-color bi-directional signal on a first fiber optic cable system is first switched to a back-up system. Then, the transmitters and receivers at both ends of the fiber optic cable, along with the cable itself, are disconnected from the existing WDMs. Attenuation devices are then removed from the 1550 nm range signal of the two-color signal pair. After that, the WDMs of that first cable system are removed and replaced with new HB3-WDMs. New transmitters and receivers are then installed for transmitting and receiving a new one-color bi-direction pair of optic signals. Next, the pre-existing transmitters, receivers and fiber optic cable, along with the new transmitters and receivers, are all connected to appropriate ports of the new HB3-WDMs. The two-color bi-directional pair of signals are then switched back from the spare line. At this point, the first cable modification is complete. Although the modified cable can now communicate both the first two-color signal pair and one signal of the new one-color signal pair, a second cable system must be modified to carry the other signal of the new signal pair.

Accordingly, a second fiber optic cable is modified as follows. First, a two-color bi-directional signal pair is switched from the second fiber optic cable system to a back-up system. The transmitters and receivers at both ends of the second cable, along with the cable itself, are then disconnected from the associated WDMs. Attenuator devices are removed from the 1550 nm signal lines and the WDMs are removed. Note that, in a preferred embodiment, there is no need for additional HB3-WDMs because one HB3-WDM replaces all of the pre-existing WDMs associated with a given pair of cables at each site. This reduces shipping and packing costs as well as installation complexity and time. Of course, the new HB3-WDMs could be packaged, just as easily, into more than one package, if it would simplify installation.

With the old equipment out of the way, the pre-existing transmitters, receivers and fiber optic cable are connected to appropriate ports of the new HB3-WDMs. Recall that the cables for the new transmitters and receivers have already been connected to the HB3-WDM during the modification to the first cable. Finally, the second pair of two-color bi-directional signals are switched from the spare channel back to the second cable system. At this point, two cable systems have been modified to carry a total of three bi-directional signal pairs.

The modification continues in a similar fashion for each of the remaining pairs of fiber optic cables in the system. The modification will permit each cable to carry one new signal in addition to the pair of signals already carried by each cable. In other words, the modification will permit each pair of cables to carry one new pair of signals in addition to the two pairs of signals already carried by each pair of cables. A modified twelve-fiber cable system, therefore, will be able to carry twelve new signals, in addition to the twenty four signals already carried, or six new signal pairs in addition to the twelve pairs of signals already carried. In a twelve cable system, therefore, the modification increases data transmission from twelve pairs of signals to eighteen pairs of signals, an increase of thirty percent over the unmodified system.

In this alternative embodiment, if one of the pre-existing twelve cables had previously been reserved as a spare cable, that cable may continue to be used as such. Moreover, of the six pairs of newly available signal paths, one of those six pairs may also be reserved as a spare for any of the other five new pairs. In this way, pre-existing levels of back-up protection are maintained.

Although a pre-existing system could be modified to communicate any of a variety of wavelengths in any given direction, this particular configuration takes advantage of attenuation characteristics of a pre-existing system such that, even though the modified cable systems contains additional opto-electronics hardware, there is no overall loss of signal strength in the system. The modification therefore, retains all of the transmitters, receivers and fiber optic cables of the pre-existing system without employing any additional signal amplifiers.

In addition, the particular combination of wide-band WDMs, narrow-band bi-directional WDMs and narrow-band uni-directional WDMs which are employed in the HB3-WDM permit pre-existing signals to travel in the same direction after modification, as they did prior to modification. Thus, in a bi-directional system where 1550 nm range signals travel west to east and 1310 nm range signals travel east to west, the direction of these signals remain the same after the modification. This way, not only are pre-existing transmitters and receivers used in the modified system, they even remain in their pre-existing locations. In the modification, preexisting cables are simply unplugged, new HB3-WDMs are installed and the pre-existing cables are plugged into the new HB3-WDMs. Hence a plug-and-play design. The modification, therefore, is extremely simple and fast, with only minimal training needed for field installers. Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS 1.0 Overview of the Present Invention The present invention provides a system and method for multiplexing three pairs of bi-directional optical signals onto two fiber optic cables without adding any attenuation over that of a system which multiplexes only two pairs of bi-directional signals onto two fiber optic cables. The present invention accomplishes this by employing hybrid, three-color, wave-division multiplexers (HB3-WDMs) to take advantage of natural attenuation differences between optical signals of different wavelengths and between narrow band and wide band WDMs.

The present invention is especially useful for upgrading existing multi-cable bi-directional systems, where each cable currently carries only one two-color pair of bi-directional signals. In such a modification, for each pair of existing fiber cables currently carrying one pair of signals each, a third pair of signals is added with only minimal cost.

2.0 High Level Overview of a Typical Two-Color, Bi-Directional, Fiber Optic Transmission System.

Figure 1:
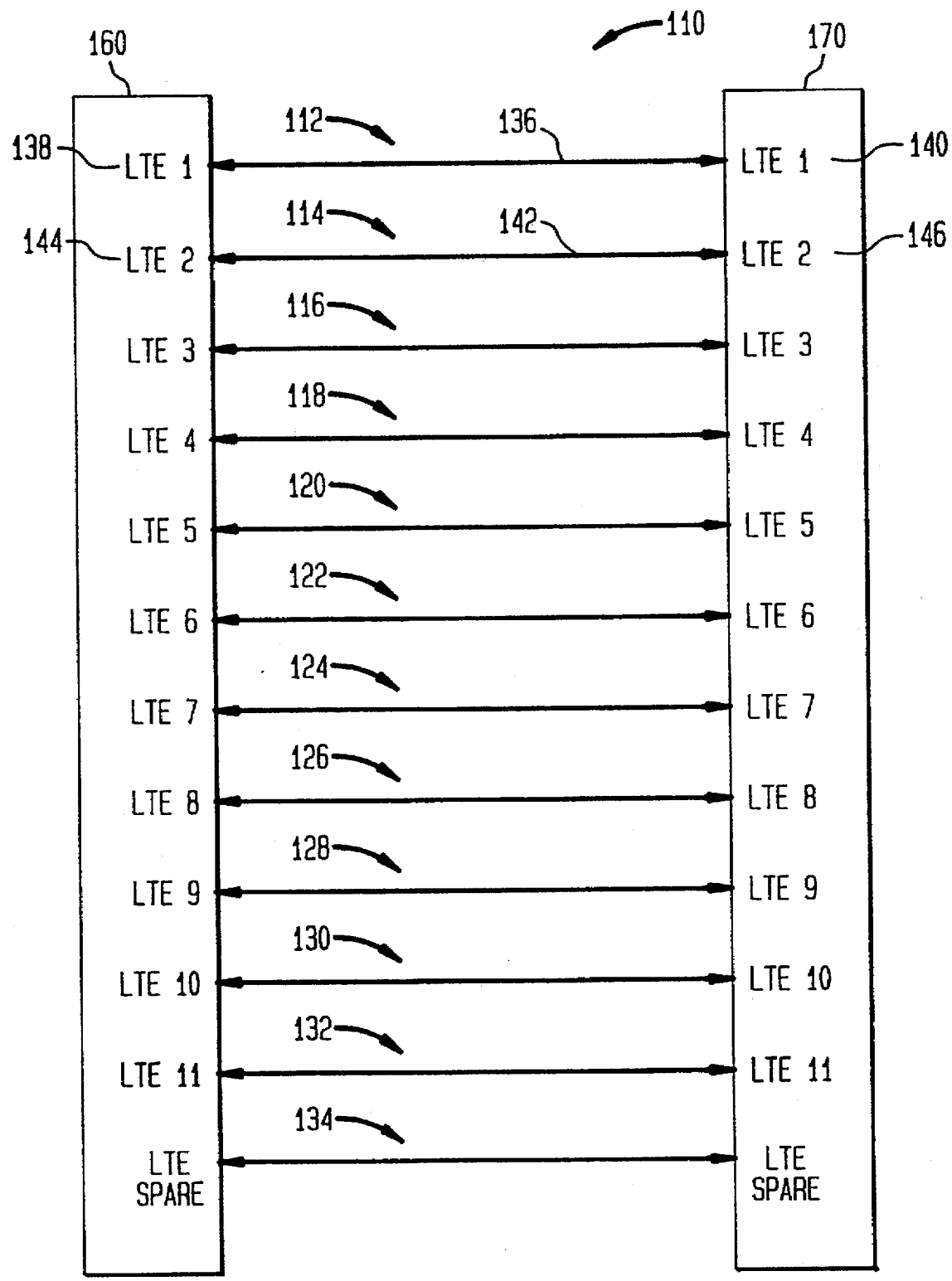
FIG. 1 is a high-level block diagram illustrating a conventional, multi-cable, bi-directional, fiber optic communication system.

Referring to FIG. 1, a typical 12-cable fiber optic communications system 110 includes twelve bi-directional fiber optic cable systems 112, 114, 116 . . . , 134. A bi-directional cable system is a cable system which is capable of communicating at least one signal in one direction and at least one other signal in the opposite direction. In system 110, cable systems 112–132 are employed as primary signal carriers while system 134 is reserved as a back-up, or spare system. Such a system, is often referred to as an 11:1 system, in reference to the eleven primary systems 112–132 and the one spare system 134.

Each cable system 112–134 includes a variety of components necessary for bi-directionally transmitting optical signals thereon. Cable system 112, for instance, includes a single-mode fiber 136 spanning between a transmit/receive system or LTE 138 at a first site 160 and a corresponding transmit/receive system or LTE 140 at a second site 170. Recall that single mode fibers are fibers with only a single communication path or core.

Cable system 114 is identical to system 112 and includes a single-mode fiber 142 spanning between a transmit/receive system or LTE 144 at first site 160 and a corresponding transmit/receive system or LTE 146 at second site 170. Cable systems 112 and 114 are typical of the remaining systems 116 through 132.

Although spare system 134 may be identical to systems 112–132, it is not necessarily the case. Spare system 134 may, instead, be a ring system or any other communications system capable of acting as a spare, or back-up communications system to any of systems 112 through 134.

2.1 Detailed Block Diagram of a Typical Two-Color, Bi-Directional, Fiber Optic Transmission System.

Figure 2:
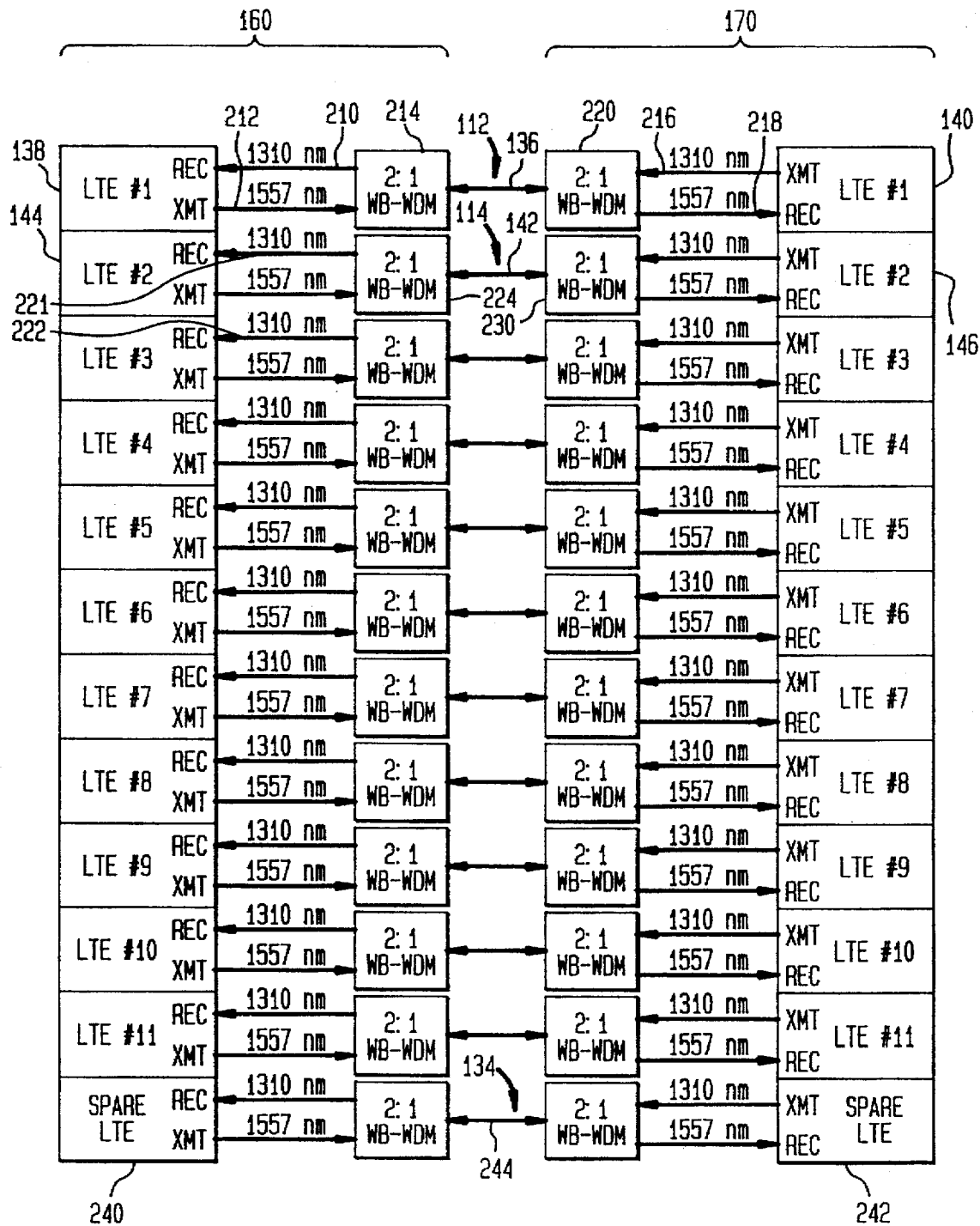
FIG. 2 is a detailed block-diagram illustrating the conventional, multi-cable, bi-directional, fiber optic communication system of FIG. 1.

Referring to FIG. 2, the system of FIG. 1 is shown in greater detail. Looking first at system 112, LTE 138 is shown receiving a 1310 nm optic signal on line 210 and transmitting a 1557 nm optic signal on line 212. The signals on lines 210 and 212 are respectively multiplexed from and to bi-directional cable 136 by 2:1 wide-band, wave-division multiplexer (WB WDM) 214. WDM 214 is referred to as a wide band device in reference to the relative wavelength separation between the 1310 nm and the 1557 nm signals which it multiplexes.

In a similar manner, LTE 140 transmits a 1310 nm signal on line 216, which is the same 1310 nm signal on line 210 and receives a 1557 nm signal on line 218, which is the same 1557 nm signal on line 212. The signals on lines 216 and 218 are respectively multiplexed to, and from, bi-directional cable 136 by WB WDM 220.

Looking next at system 114, LTE 144 is shown receiving a 1310 nm optic signal on line 221 and transmitting a 1557 nm optic signal on line 222. The signals on lines 220 and 222 are respectively multiplexed from, and to, bi-directional cable 142, by WB WDM 224. Similarly, LTE 146 transmits a 1310 nm signal on line 226, which is the same 130 nm signal on line 221 and receives a 1557 nm signal on line 228, which is the same 1557 nm signal on line 222. The signals on lines 226 and 228 are respectively multiplexed to, and from, bi-directional cable 142 by WB WDM 230.

Again, systems 112 and 114 are typical of the remaining systems 116–134.

Figure 3:
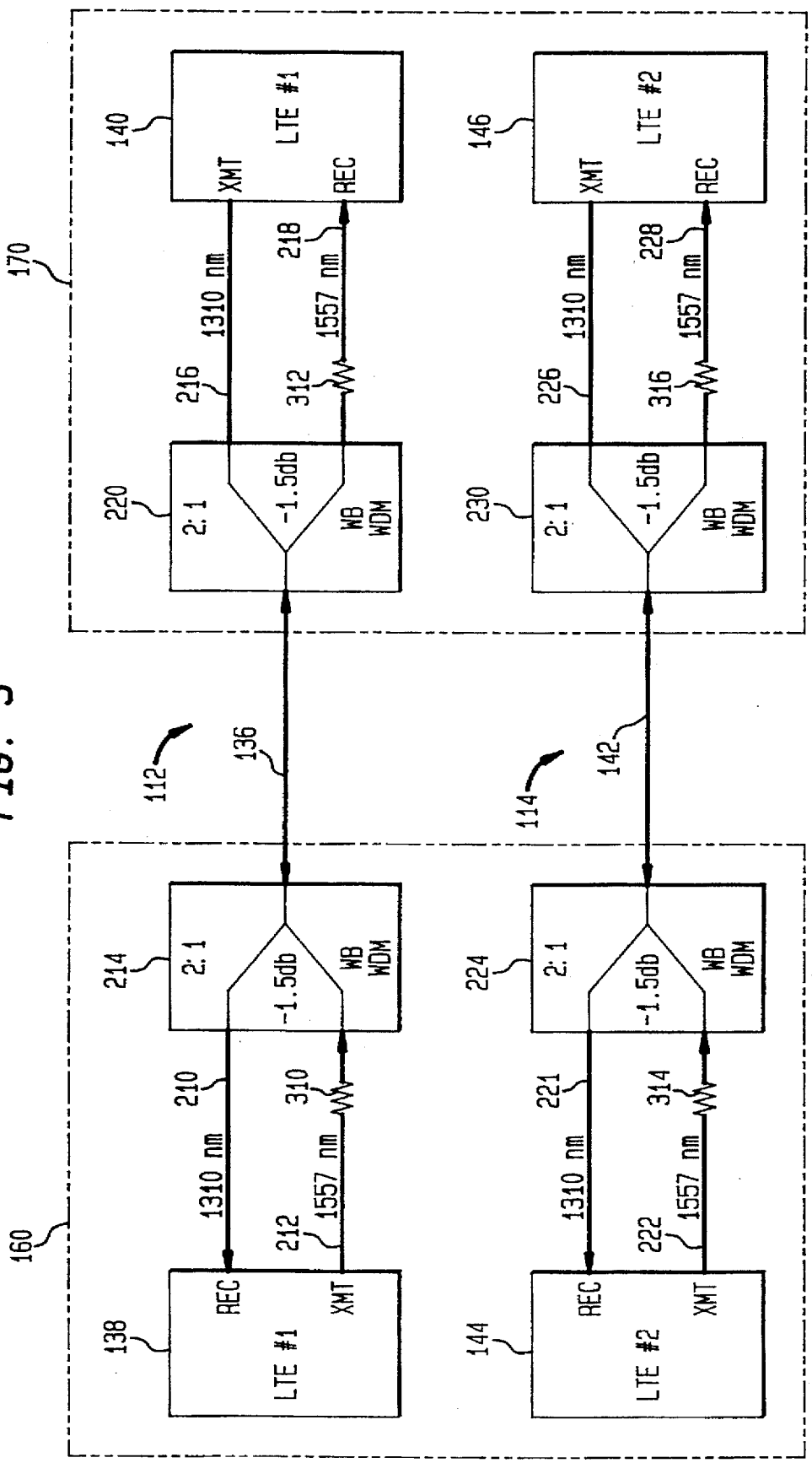
FIG. 3 is a detailed block-diagram illustrating two particular cable systems of the conventional, multi-cable, bi-directional, fiber optic communication system of FIGS. 1 and 2.

Referring to FIG. 3, an expanded view of systems 112 and 114 is shown. Here, each wide band WDM 214, 220, 224 and 230 is shown having a 1.5 db attenuation factor. This attenuation is inherent in each device and affects all signals multiplexed through the WDMs, regardless of wavelength.

As previously stated, optic signals in the range of 1550 nm travel over fiber optic cable with less dispersion than optic signals in the range of 1310 nm. As a result, at distances of about 45 km, which is typically the distance between site 160 and site 170, optic signals in the range of 1310 nm are be attenuated by as much as 5 db relative to 1550 nm range signals. Because of this, system 112 includes attenuation devices 310 and 312 which reduce the signal strength of the 1557 nm signal on lines 212 and 218 to the levels of the 1310 nm signal on lines 210 and 216, respectively. Similarly, in system 114, attenuation devices 314 and 316 reduce the signal strength of the 1557 nm signal on lines 222 and 228 to the level of the 1310 nm signal on lines 221 and 226, respectively. Keeping the 1557 nm and 1310 nm signals at the same level permits receivers, WDMs and other optical-electronic devices to be designed around common signal levels.

3.0 Hybrid, Three-Color WDM System (HB3-WDM)

3.1 Overview

A hybrid WDM is a WDM which employs a combination of wide band and narrow band WDM devices. Recall that wide band devices multiplex signals in a range centered around 1310 nm with signals in a range centered around 1550 nm. Narrow band devices, on the other hand, only multiplex signals centered around 1310 nm or signals centered around 1550 nm. A three color WDM is a WDM which is capable of multiplexing three colors onto a single fiber optic cable. A hybrid, three-color WDM or HB3 WDM, then, is a WDM which employs a combination of wide band and narrow band devices to multiplex three colors, i.e., three signals of different wavelengths, onto a single fiber optic cable.

3.2 HB3-WDM Components

Many combinations of wide band and narrow band WDMs can be employed to produce a variety of HB3-WDM devices. Of particular interest here are four embodiments shown in FIGS. 4a–4d.

Figure 4A:
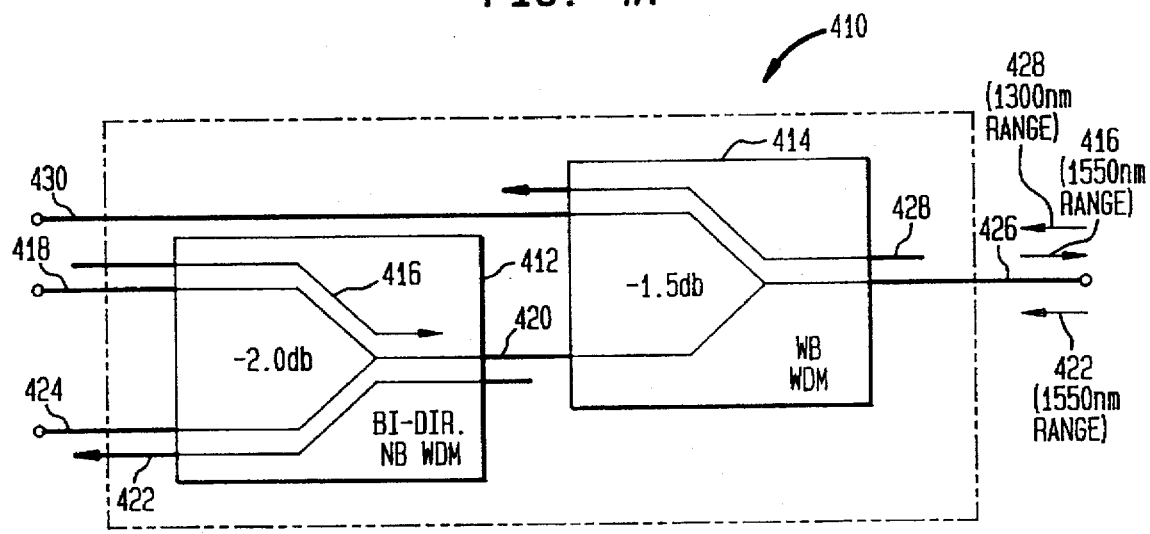
FIGS. 4a–4d are schematic diagrams of four embodiments of a hybrid, three-color wave-division multiplexer (HB3-WDM) employed by the present invention.

Referring first to FIG. 4a, a first HB3-WDM 410 is shown, having WDM devices 412 and 414. As shown, a 1310 nm range signal 428 is demultiplexed from line 426 to line 430 by WDM 414. A 1550 nm range signal 422 is also demultiplexed from line 426 by WDM 414. Signal 422, however, is demultiplexed onto line 420 rather than line 430. Because WDM 414 distinguishes between a 1310 nm range signal and a 1550 nm range signal, it is considered a wide band device and given the distinction WB-WDM, WB for wide band device. From line 420, signal 422 is then demultiplexed onto line 424 by WDM 412.

A second 1550 nm range signal 416 originates on line 418 and travels in the opposite direction as first 1550 nm range signal 422. Signal 416 is multiplexed from line 418 onto line 420 by WDM 412. Because signals 416 and 422 are within the same signal range, namely, 1550 nm, device 412 must be a narrow band device. WDM 412, is thus .given the distinction NB-WDM, NB for narrow band. Note that narrow band devices, unlike wide band devices, are either uni-directional or bi-directional. In this case, because 416 and 422 are traveling in opposite directions, device 412 must be a bi-directional narrow band device, as indicated in the figure. From line 420, signal 416 is multiplexed onto line 426 by WB-WDM 414. Because device 414 is a wide band device, and because any given wide band devices can handle both bi-directional signals and uni-directional signals, it does not matter which way any of the individual signals are traveling through device 414. That is, device 414 does not have to be specified as either a bi-directional device or a uni-directional device.

The WDM combination 410 of FIG. 4a, thus multiplexes one 1550 nm range signal onto line 426 and demultiplexes both a 1550 nm range signal and a 1310 nm range signal from line 426. This combination of WDMs is, therefore, a three color (two 1550 nm range signals and one 1310 nm range signal), wide band/narrow-band bi-directional WDM, or HB3-WDM.

Figure 4B:
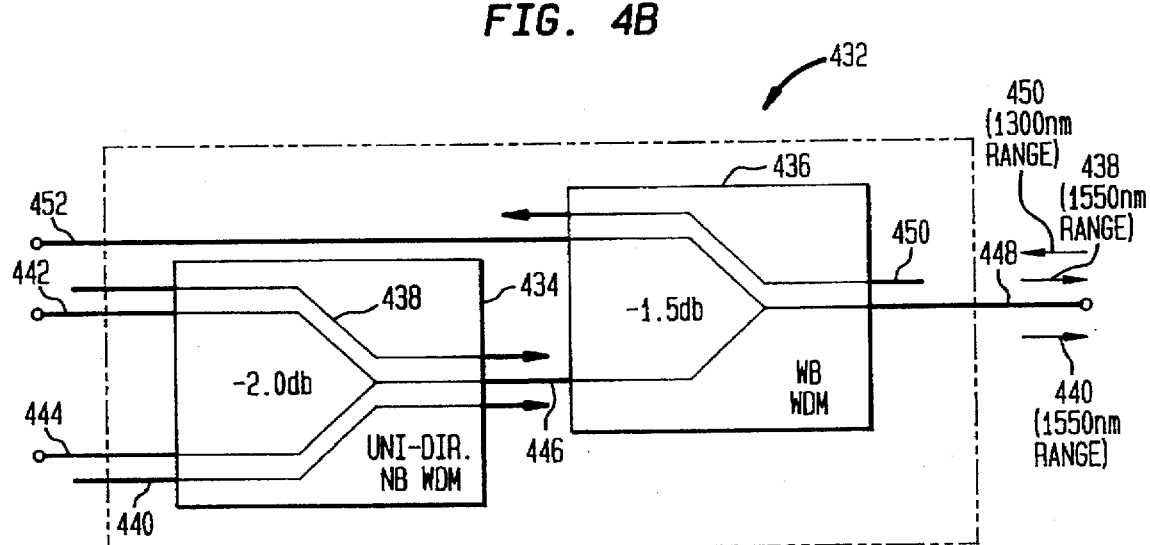

Referring to FIG. 4b, a second HB3-WDM 432 includes WDM devices 434 and 436 which, together, multiplex two 1550 nm range signals onto a common line 448 and demultiplex a 1310 nm range signal from the common line 448.

More particularly, WDM 434 is shown multiplexing two 1550 nm range signals, 438 and 440, from lines 442 and 444, respectively, onto line 446. As in FIG.4a, because both signals 438 and 440 are within the same signal range, namely, 1550 nm, device 434 must be a narrow band device. Unlike FIG. 4a, however, because signals 438 and 440 are traveling in the same direction, device 434 must be a uni-directional narrow band device.

Device 436 multiplexes 1550 nm range signals 438 and 440 from line 446 onto line 448. Device 436 also demultiplexes a 1310 nm range signal 450 from line 448 onto line 452. Because device 436 is multiplexing signals in two distinct signal ranges, namely 1310 nm and 1550 nm, device 436 must be a wide band device. As noted above, wide band devices are not distinguished as being uni-directional or bi-directional.

Figure 4C:
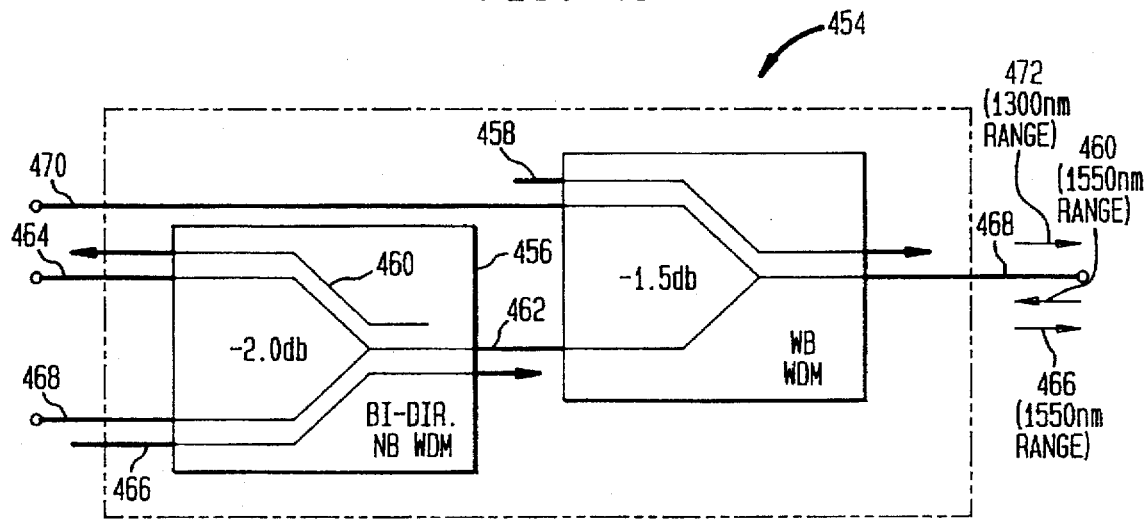

In FIG. 4c, HB3-WDM 454 includes WDM devices 456 and 458, which together, multiplex a 1310 nm range signal and a 1550 nm range signal onto a common line 468 while demultiplexing another 1550 nm range signal from the common line 468.

More particularly, 1310 nm range signal 472 is multiplexed from line 470 onto line 468 by WB-WDM 458. A first 1550 nm range signal 466 is multiplexed from line 468 onto line 462 by NB-WDM 456, from where it is then multiplexed onto line 468 by WB-WDM 458. A second 1550 nm range signal 460 is demultiplexed from line 468 to line 462 by WB-WDM 458, from where it is demultiplexed onto line 464 by NB-WDM 456.

Figure 4D:
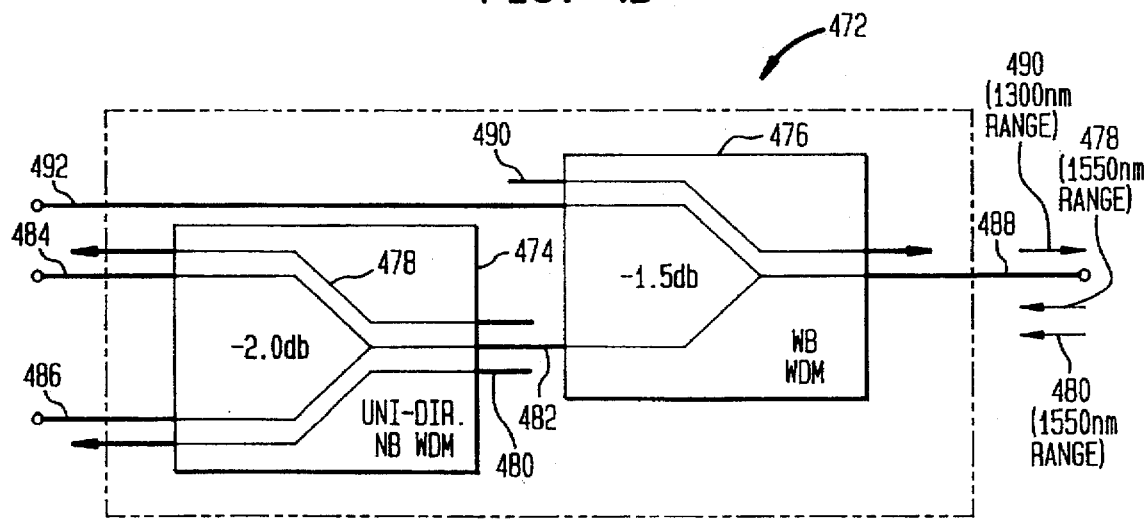

Finally, in FIG. 4d, a fourth HB3-WDM 472 multiplexes a 1310 nm range signal onto a common line while demultiplexing two 1550 nm range signals from that common line.

More specifically, WB-WDM 476 multiplexes 1310 nm range signal 490 from line 492 onto line 488. WB-WDM 476 also demultiplexes two 1550 nm range signals 478 and 480 from line 488 to line 482, from where uni-directional NB-WDM 474 demultiplexes signals 478 and 480 to lines 484 and 486, respectively.

Note the "db" designations placed within each WDM device in each of the FIGS. 4a–4d. These designations reflect the relative losses suffered by optic signal passing through the devices. Generally, wide band devices degrade signals by about 1.5 db while narrow band devices degrade a signals by about 2 db. The significance of these difference will be discussed below.

The present invention contemplates other combinations of wide band and narrow band optical multiplexing devices. The four specific embodiments detailed above are provided for illustrative purposes. One skilled in the art will readily appreciate the various other embodiments that can be designed.

3.3 HB3-WDM Systems

Figure 5:
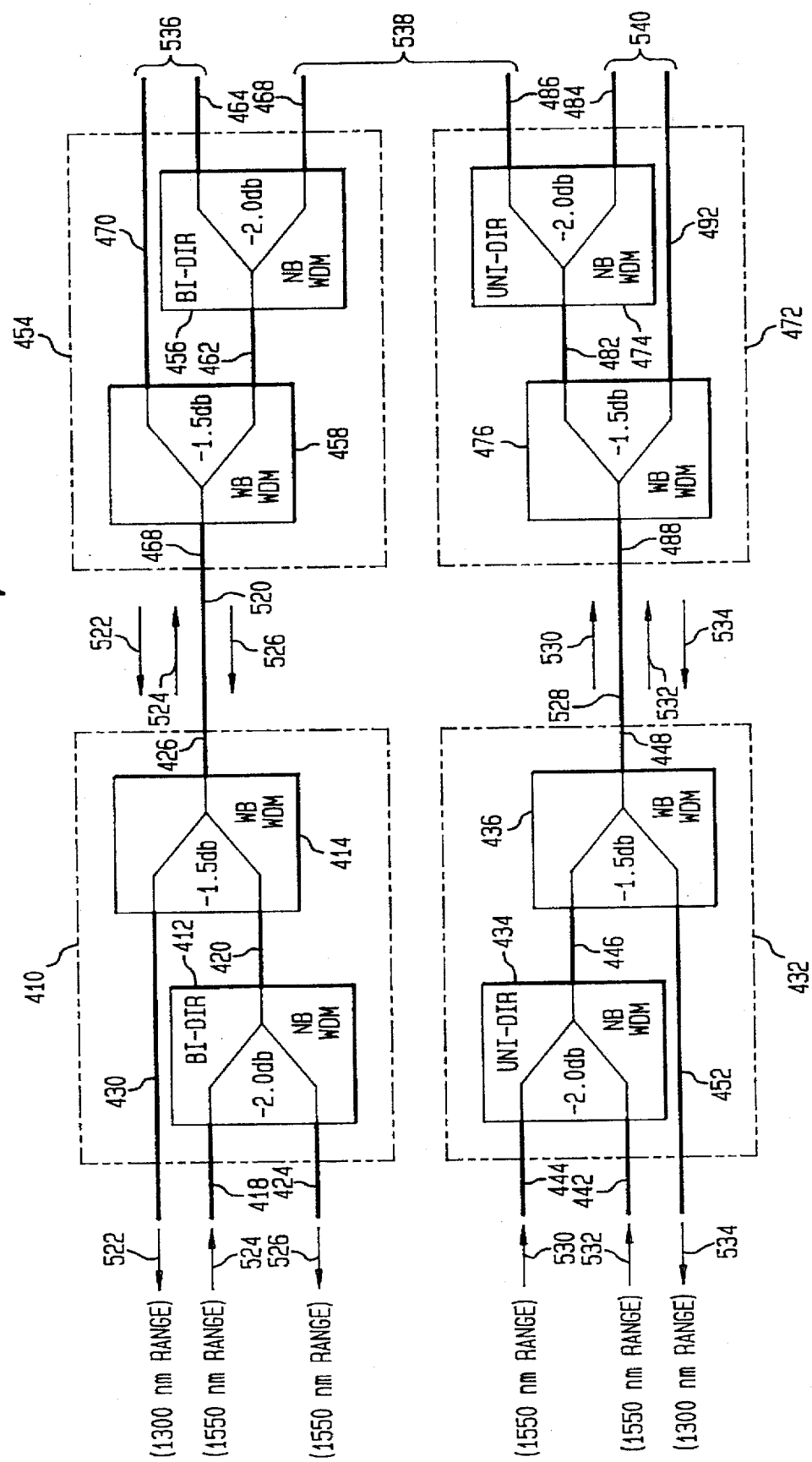
FIG. 5 is a schematic diagram showing the four HB3-WDMs of FIG. 4 coupled according to the present invention.

In FIG. 5, a HB3-WDM system 510 includes the HB3-WDM devices 410, 432, 454, 472, 514, 516 and 518 of FIGS. 4a–4d. Note that individual elements of devices 410, 432, 454 and 472 have been rearranged for ease of display and explanation.

System 510 includes a first cable system where HB3-WDM 410 is coupled by a cable 520, and a second cable system where HB3-WDMs 432 and 472 are coupled by a cable 528. In the first cable system, cable 520 carries a 1310 nm range signal 522 from fight to left, a first 1550 nm range signal 524 from left to right, and a second 1550 nm range signal 526 from fight to left.

Signal 522 originates on line 470 of HB3-WDM 454 and is multiplexed onto cable 520 by WB-WDM 458. After traveling over cable 520, signal 522 reaches HB3-WDM 410 where it is demultiplexed from cable 520 onto line 430 by WB-WDM 414.

Signal 524 originates on line 418 of HB3-WDM 410 and is multiplexed onto line 420 by NB-WDM 412. From line 420, signal 524 is multiplexed onto cable 520 by WB-WDM 414. After traveling over cable 520 to HB3-WDM 454, signal 524 is demultiplexed onto line 462 by WB-WDM 458, from where it is demultiplexed onto line 464 by NB-WDM 456.

Signal 526 originates on line 468 of HB3-WDM 455 and is multiplexed onto line 462 by NB-WDM 456, from where it is multiplexed onto cable 520 by WB-WDM 458. After traveling over cable 520 to HB3-WDM 410, signal 526 is demodulated onto line 420 by WB-WDM 414, from where it is demultiplexed onto line 424 by NB-WDM 412.

HB3-WDMs 410 and 454, thus, multiplex three optical signals, each having a different wavelength or "color," over fiber optic cable 520.

In the second cable system, HB3-WDMs 432 and 472, operates in much the same fashion as the first system, with one major difference in signal directions. While each system has a 1310 nm range signal traveling from fight to left and a 1550 nm range signal traveling from left to right, 1500 nm range signal 526 of the first system and 1500 nm range signal 530 of the second system, travel in opposite directions. The significance of this difference is that, of the six signals carried by cables 520 and 528, three of those signals, namely 524, 530 and 532 travel from left to right while the other three signals 522, 526 and 534 travel from right to left. Dividing these signals into transmit/receive pairs 526/530 and 532/534, it can be seen that such a system can accommodate three pairs of bi-directional signals 536, 538 and 540, on just two fiber optic cables 520 and 528.

This is possible because of the specific configuration of WDMs contained within the HB3-WDMs. More specifically, uni-directional NB-WDMs 434 and 474 in HB3-WDMs 432 and 472, respectively, allow 1550 nm range signals 530 and 532 to travel in the same direction. Bi-directional NB-WDMs 412 and 474 in HB3-WDMs 410 and 454, respectively, on the other hand, allow 1550 nm range signals 524 and 526 to travel in opposite directions.

A second important aspect of this design is the accumulation of attenuation factors on the various signal lines. Specifically, each of the 1310 nm range signals 522 and 534 pass through only two WDMs. Signal 522, for instance, travels through WB-WDMs 458 and 414. Because each WB-WDM imposes 1.5 db of attenuation on each signal that passes through it, each 1310 nm range signal 522 and 534 is subjected to 2×1.5 db or 3 db attenuation each.

Because each 1550 nm range signal because passes through two NB-WDMs in addition to passing through two WB-WDM, they are subjected to greater attenuation from WDMs than are the 1310 nm range signals. For instance, signal 524 passes through NB-WDM 412, where it is attenuated by 2 db, after which it passes through WB-WDM 414, where is attenuated another 1.5 db, after which it is attenuated a further 1.5 db in WB-WDM 458 and yet another 2 db in NB-WDM 456. 1550 nm range signal 524, as with the remaining 1557 nm range signals, is thus attenuated by a total of 7 db as a result of the various WDMs in its pass, compared to a loss of only 3 db in the 1310 nm range signals.

Recall, however, that 1310 nm signals are subjected to an additional 5 db attenuation when traveling over 45 km of fiber optic cable. Recall also, that is existing systems, this 5 db attenuation is compensated for by adding 5 db attenuators to 1550 nm range signals. Because the present invention adds an additional 4 db to the 1550 nm range signals, the old attenuators are no longer necessary. The new design, therefore, permits three pairs of signals to communicate over two fiber optic cables, at substantially the same signal levels, without the need for additional attenuation devices.

Figure 6:
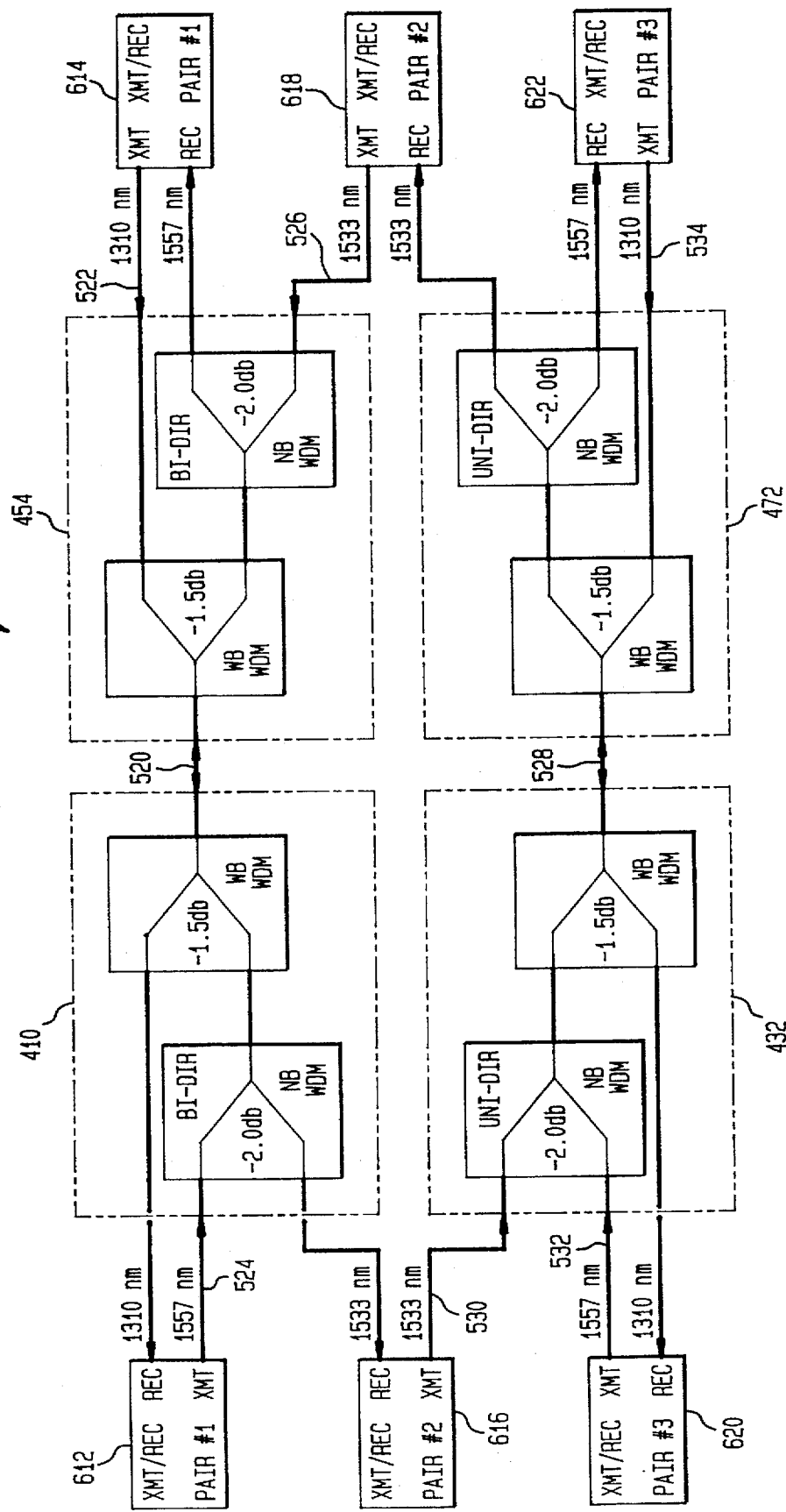
FIG. 6 is a schematic diagram of a complete HB3-WDM system according to the present invention.

Referring to FIG. 6, a preferred embodiment of a complete HB3-WDM system 610 is shown. The system is essentially the same as that described in relation to FIG. 5, with the addition of three pairs of transmit/receive CXMT/REC) systems 612 and 614, 616 and 618, and 620 and 622. These transmit/receive systems provide the necessary transmitters and receivers for generating and receiving signals 522, 524, 526, 530, 532 and 534. In the preferred embodiment, signals 522 and 534, transmitted by XMT/REC systems 614 and 622, respectively, are 1310 nm. Signals 524 and 532, transmitted by XMT/REC systems 612 and 620, respectively, are 1557 nm. Signals 526 and 530, transmitted by XMT/REC systems 618 and 616, respectively, are 1533 nm.

4.0 HB3-WDM Modification of Existing Fiber Optic Systems

While the present invention may be practiced in any number of fiber optic transmission systems, it is especially useful as a "plug-and-play" modification to an existing multi-cable system. As a modification, the present invention may be implemented on any of a variety of pre-existing fiber optic communications systems to increase data transmission by as much as thirty percent. In order to provide the reader with a more complete understanding of the invention, however, the invention will be described as implemented on the 12-cable fiber optic system described in relation to FIGS. 1–3.

4.1 Overview

The modification will be described according to the steps outlined in the flowchart of FIG. 7. For ease of understanding, reference will also be made to FIG. 8 which represents the identical pre-existing system shown in FIG. 3. The only difference between FIG. 3 and FIG. 8 is that in FIG. 8, system 114 has been vertically "flipped" or mirror-imaged. This is done solely for the sake of visual convenience of the reader. The purpose, as will become more clear below, is to more clearly show how a new bi-directional 1550 nm-range signal is coupled with existing pre-existing 1550 nm range signals. There is no actual physical requirement that the terminals on one LTE be reversed with respect to any other terminal.

Figure 8:
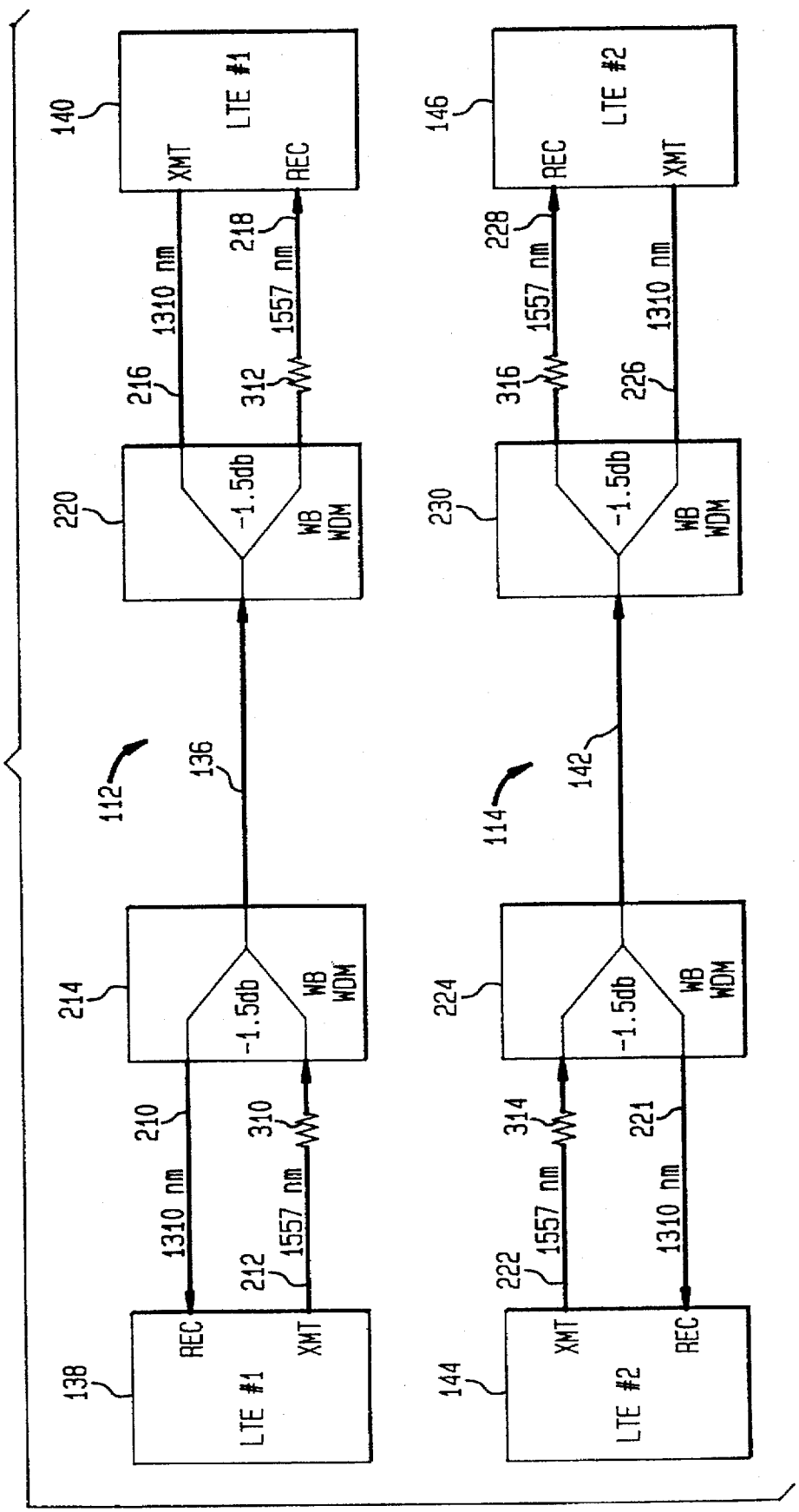
FIG. 8 is a detailed block-diagram illustrating the two cable systems of FIG. 3 with the second cable system vertically mirrored.
Figure 9:
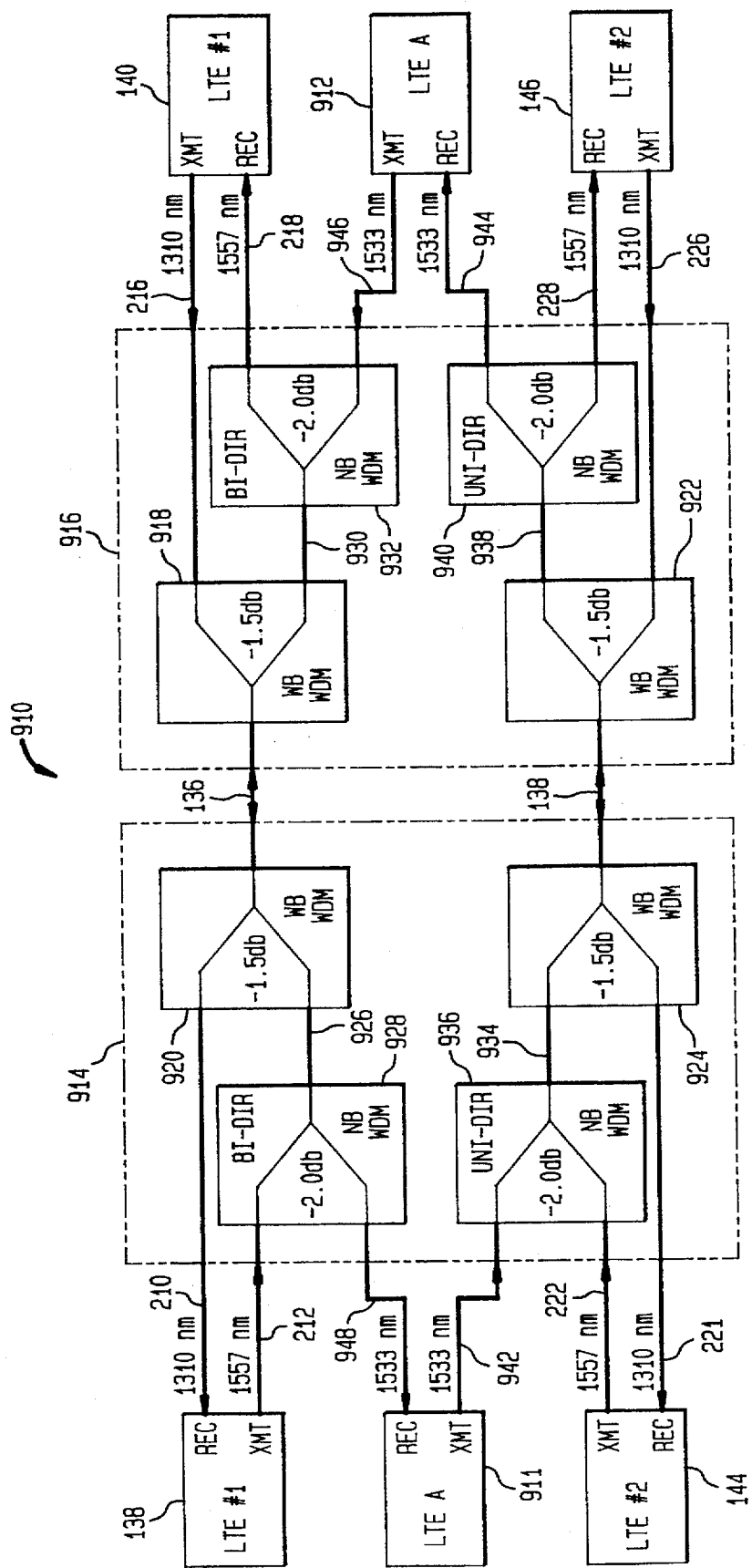
FIG. 9 is a schematic diagram of the two cable systems depicted in FIG. 8, modified according to the flow diagram of FIG. 7.
Figure 10:
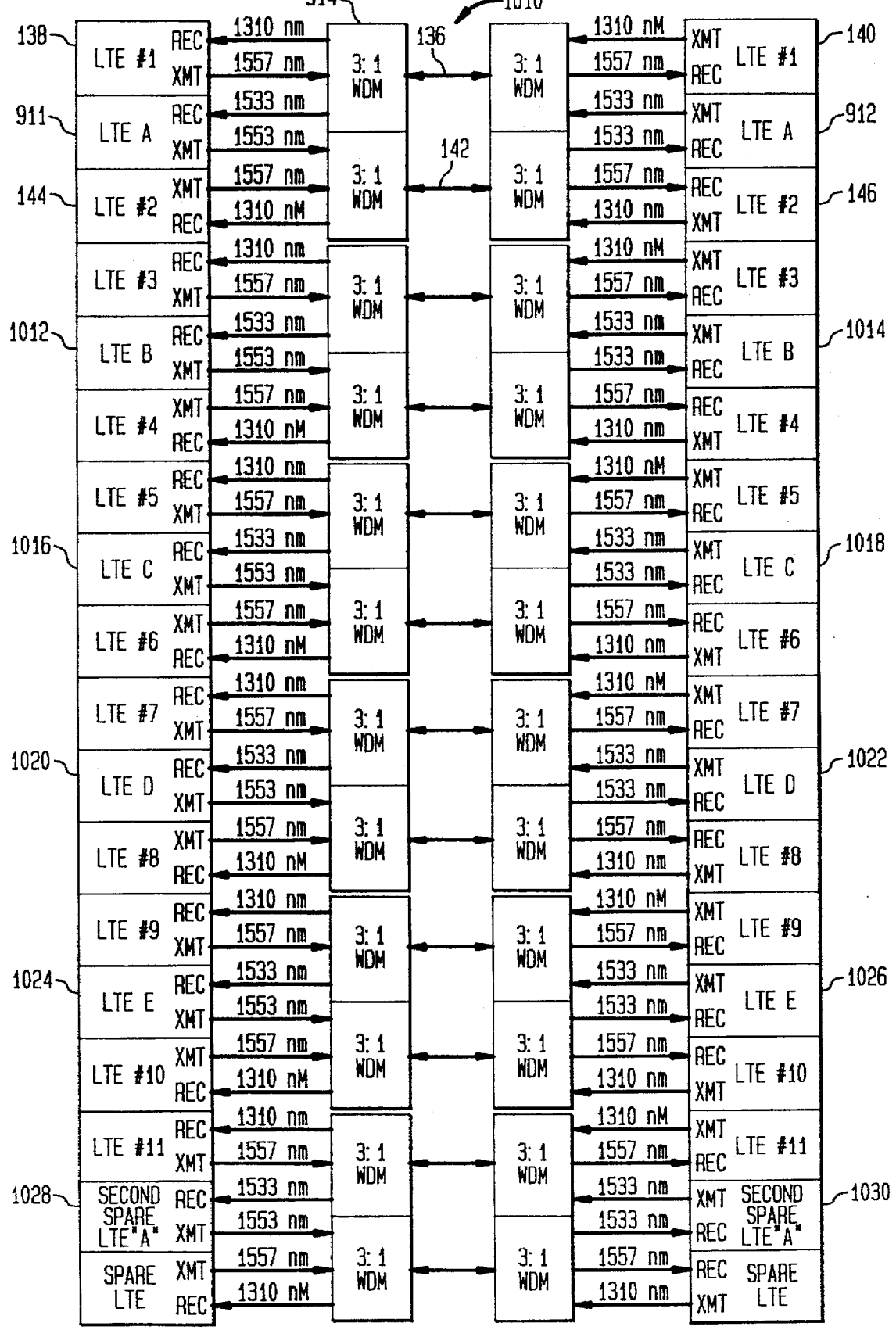
FIG. 10 is a high-level block-diagram of the system of FIG. 2, modified according to the flow diagram of FIG. 7.

In describing the modification, reference will also be made to FIG. 9, which shows systems 112 and 114 of FIG. 8, modified according to the present invention. Reference will also be made to FIG. 10 which shows a block-diagram of the twelve-cable system of FIG. 2, modified according to the present invention.

4.2 Modification

Figure 7:
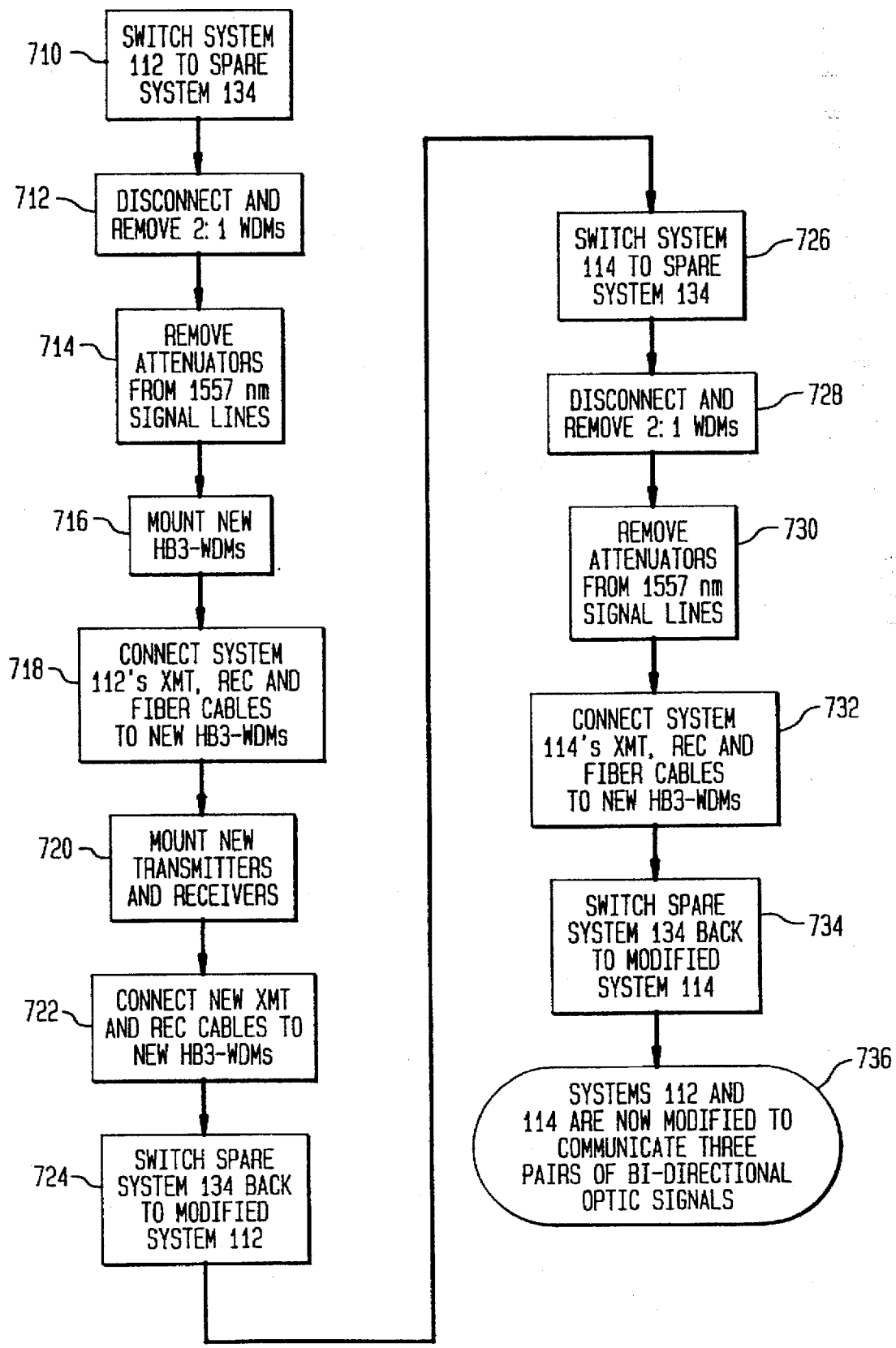
FIG. 7 is a flow diagram illustrating how the present invention is employed as a modification to a pre-existing multi-cable, two-color, bi-directional fiber optic communication system.

Referring to the flowchart of FIG. 7, the modification begins by choosing a pair of fiber optic cable systems to modify. For ease of explanation, the modification steps will be described in relation to cable systems 112 and 114 of FIGS. 1, 2, 3 and 8.

In Step 710, the function of system 112 is switched to spare system 134 so that the 1310 nm signal transmitted by LTE 140 is, instead, transmitted by LTE 242 and the 1557 nm signal transmitted by LTE 138 is, instead, transmitted by LTE 240. These signals will then communicate between sites 160 and 170 over fiber optic cable 244 rather than cable 136. In this way, system 112 can be modified without adverse effect on communications system 110.

In Step 712, with system 136 disabled, WDMs 214 and 220 are removed from system 112. This is accomplished by disconnecting all lines into and out of the WDMs, including lines 210, 212, 216, 218 and fiber optic cable 136. After disconnecting, the WE)Ms are removed and discarded.

In Step 714, attenuators 310 and 312 are removed and discarded from lines 212 and 218, respectively. These are no longer needed because the new HB3-WDMs, as described below, will provide essentially the same level of attenuation to signals 212 and 218 previously provided by the attenuators.

In Step 716, a new HB3-WDM is mounted on existing racks, in place of each of the disconnected and removed WDMs. In the preferred embodiment, one new HB3-WDM contains the proper combination of wide band and narrow band WDMs necessary for operation of two complete cable systems. This reduces packing, shipping and installation costs. In FIG. 9, therefore, HB3-WDM 914 replaces WDMs 214 and 224 of FIG. 2 and HB3-WDM 916 replaces WDMs 220 and 230. In the preferred embodiment, one new HB3-WDM will take up no more horizontal "shelf" space than two previous WDMs. This will insure that the modification can be performed without a need for additional "shelf" space. The vertical height of the new HB3-WDMs may, however, be greater than the previous WDMs. Of course, if vertical space is limited, the HB3-WDMs may be packaged in any way necessary to insure that space is conserved in the most practical manner.

In Step 718, pre-existing cables are connected to the new HB3-WDMs. Lines 210 and 212 are connected to appropriate ports of HB3-WDM 514, lines 216 and 218 are connected to appropriate ports of HB3-WDM 516 and each end of fiber optic cable 136 is connected to the appropriate port of respective HB3-WDMs 914 and 916.

In Step 720, new transmit/receive LTEs 911 and 912 are mounted in the vicinity of the existing LTEs. The new transmit/receive LTEs will provide a new pair 1533 nm of bi-directional signals to be communicated over the existing pair of fiber optic cables.

In Step 722 new LTEs 911 and, 912 are connected to new HB3-WDMs 914 and 916, respectively. This includes connecting transmit and receive cables 942 and 948 of LTE 911 to appropriate ports of HB3-WDM 914. Likewise, transmit and receive cables 946 and 944 of new LTE 912 are connected to appropriate ports of HB3-WDM 916.

In Step 724, the function of system 112 is switched from spare system 134 to modified system 910. At this point, LTEs 138 and 140 can communicate with each other through cable 136.

In Step 726, the modification of system 114 begins by switching the function of system 114 to spare system 134 so that the 1310 nm signal transmitted by LTE 146 is, instead, transmitted by LTE 242 and the 1557 nm signal transmitted by LTE 144 is, instead, transmitted by LTE 240. These signals will then communicate between sites 160 and 170 over fiber optic cable 244 rather than cable 142. In this way, system 114 can be modified without adverse effect on the communications system.

In Step 728, with system 114 disabled, WDMs 224 and 230 are removed. This is accomplished by disconnecting all lines into and out of the WDMs, including lines 221, 222, 226, 228 and fiber optic cable 142. After disconnecting, the WDMs are removed and discarded.

In Step 730, attenuators 314 and 316 are removed and discarded from lines 222 and 228, respectively. These are no longer needed because new HB3-WDMs provide essentially the same level of attenuation to signals 222 and 228 previously provided by the attenuators.

In Step 732, the transmit and receive lines of LTEs 144 and 146 as well as fiber optic cable 142 are connected to corresponding ports on the new HB3-WDMs 914 and 916.

In Step 734, the function of system 114 is switched from spare system 134 to fiber optic cable 138 of modified system 910.

At this point, as shown in terminating bubble 736, the modification to the first pair of systems 112 and 114 is complete. The modification to the remaining systems 116–134 follow the same steps as those performed in the modification to systems 112 and 114.

Referring to FIG. 9, systems 112 and 114 of FIG. 8 are shown in their modified form. As seen, by adding only a small amount of hardware to systems 112 and 114, a third pair of signals is communicated over a pair of existing fiber optic cables. Modified system 910 continues to employ a substantial portion of systems 112 and 114, including LTEs 138, 140, 144, 146 and fiber optic cables 126 and 142 and operates the same as the system described in relation to FIGS. 5 and 6.

Note specifically that the 1310 nm signals of modified system 910 travel east to west, or right to left, as do the 1310 nm signals of unmodified system 112. Note also that the 1557 nm signals of system 910 travel west to east, or left to right, as do the 1557 nm signals of system 112. The particular design of HB3-WDMs 914 and 916, therefore, by not altering any pre-existing signal directions, permit pre-existing transmitters and receivers to be employed after the modification and at their previous locations. This is very important because it permits the modification to be performed by simply removing and replacing old WDMs with new HB3-WDMs, and is, therefore, a "plug-and-play" modification.

The signal paths for the 1310 nm signals are essentially unaltered by the modification. For example, LTE 140 transmits a 1310 nm signal onto line 216 which is coupled onto fiber optic cable 136 by WB WDM 918. The 1310 nm signal is decoupled from cable 136 by WB WDM 920, onto line 210, from where is received by LTE 138. Effectively, WDM 918 in the modified system replaces WDM 220 of system 112 and WDM 920 of the modified system replaces WDM 214 of system 112. The 1310 nm signal, therefore, travels essentially the same path in the modified system as it did in the 112 system.

Similarly, in the modified system, LTE 146 transmits a 1310 nm signal onto line 226 which is coupled onto cable 138 by WB WDM 922. This 1310 nm signal is decoupled from line 138 onto line 221 by WB WDM 924, from where it is received by LTE 144. WDM 922 in the modified system thus replaces WDM 230 of system 114 and WDM 924 of the modified system replaces WDM 224 of system 114. This 1310 nm signal, therefore, also travels essentially the same path in the modified system as it did in the 114 system.

In the modified system, unlike the 1310 nm signal paths, the signal paths for the pre-existing 1557 nm signals have been altered. The 1557 nm transmitted by LTE 138 onto line 212, for instance, is coupled onto line 926 by a NB-WDM 928, neither of which formed part of pre-existing system 112. The 1557 nm signal is then coupled onto fiber optic cable 136 by WB WDM 920, which, as previously stated, is analogous to WDM 214 of system 112. This 1557 nm signal is decoupled from cable 136 onto line 930 by WB-WDM 918, which is analogous to WDM 220 of system 112. The signal on line 930 is then decoupled onto line 218 by NB-WDM 932, again, neither of which existed in the prior system from where it is received by LTE 140.

In a similar manner, the 1557 nm signal transmitted by LTE 144 is coupled from line 222 onto line 934 by NB-WDM 936, from where it is coupled onto cable 138 by WB WDM 924. The 1557 nm signal is decoupled from cable 138 onto line 938 by WB-WDM 922, from where it is decoupled onto line 228 NB WDM 540, from where it is received by LTE 146.

In the modified system, therefore, the 1557 nm signals go through two NB WDMs in addition to two WB WDMs. While these NB-WDMs are necessary to permit the addition of the new pair of 1550 nm-range signals, they also add attenuation to the signals which pass through them.

More specifically, each of the new NB-WDMs add 2 db of attenuation to the signal for a total of 4 db over the mount induced in the pre-existing system. As a result, 5 db attenuators 310, 312, 314 and 316 have been removed from the system. Although removing the attenuators leaves the 1557 nm signals at roughly 1 db above the corresponding 1310 nm signal, such is not deemed significant enough to replace the 5 db attenuators with 1 db attenuators. Rather, it is believed that the system can tolerate the 1 db difference without significant drawback.

As just described, the 1310 and 1557 signal pairs of the modified system are functionally equivalent to pre-existing systems 112 and 114. The new NB-WDMs have simply taken the place of the old signal attenuators. The NB-WDMs also, however, provide new capacity for an additional pair of 1550 nm range signals.

Accordingly, and still referring to FIG. 9, LTE 911 transmits a 1533 nm signal onto line 942 from where it is coupled onto line 934 by NB-WDM 936. The signal is then coupled onto cable 138 by WB-WDM 924. At the other end of cable 138, the 1533 nm signal is decoupled onto line 938 by WB-WDM 922, from where it is decoupled onto line 944 by NB-WDM 940, from where it is received by new LTE 912.

Similarly, new LTE 912 transmits a 1533 nm signal onto line 946 from where it is coupled onto line 930 by NB-WDM 932, from where the signal is coupled onto cable 136 by WB WDM 918. At the other end of line 136, the 1533 nm signal is decoupled onto line 926 by WB-WDM 920, from where the signal is decoupled onto line 548 by NB-WDM 928, from where it is received by LTE 911.

Thus, new LTEs 911 and 912 provide an additional transmit/receive signal pair which are multiplexed over existing fiber optic cables 136 and 142 by HB3-WDMs 915 and 916.

4.3 Preservation of Back-up Systems

As previously stated, the modification continues with each pair of fiber optic cables in system 110; until all are modified. Once complete, communications system 110 would appear as hybrid, three-color, WDM system 1010 in FIG. 10.

Of particular importance is that the transmit and receive function of pre-existing systems 112 through 132 can still be switched to spare system 134, thereby maintaining pre-existing 11:1 back-up protection. Additionally, with six new transmit and receive LTE pairs 911 and 912, 1012 and 1014, 1016 and 1018, 1020 and 1022, 1024 and 1026, and 1028 and 1030, one of these new pairs can be reserved as a back-up for the remaining five pairs. In this way, the new LTE pairs constitute a 5:1 system. The modified system, thus, may be viewed as two semi-independent systems having 11:1 back-up and 5:1 back-up or as one integrated system having sixteen revenue channels and two back-up channels. Note that back-up channels are generally used to carry various internal data between sites when not utilized as a spare.

5.0 Conclusion

These two representative embodiments are presented by way of example only. It would be apparent to a person skilled in the relevant art how alternative hybrid, three-color WDM systems could be implemented to multiplex more than two pairs of bi-directional optical signals over one pair of fiber optic cables without adding attenuation to the system. Additionally, changes to the HB3-WDM system could be made depending on the specific wavelengths and optical-electronic hardware associated with the system.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A fiber optic communication system, comprising:
    a first optic fiber extending between a first transmit/receive site and a second transmit receive site;
    a second optic fiber, substantially parallel to said first optic fiber, extending between said first transmit/receive site and said second transmit/receive site;

a plurality of modularized wave division multiplexers (WDMs) located at said first and second sites for multiplexing a first pair of bi-directional signals and a first signal of a second pair of bi-directional signals over said first optic fiber and for multiplexing a third pair of bi-directional signals and a second signal of said second pair of bi-directional signals over said second optic fiber.

2. The fiber optic communication system of claim 1, wherein said plurality of WDMs comprise:

(a) a first hybrid bi-directional three color WDM (HB3-WDM) at said first site and a second HB3-WDM at said second site for multiplexing said first pair of bi-directional signals and said first signal of said second pair of bi-directional signals over said first bi-directional optic fiber; and, b) a third HB3-WDM at said first site and a fourth HB3-WDM at said second site for multiplexing said third pair of bi-directional signals and said second signal of said second pair of bi-directional signals over said second optic fiber.

3. The fiber optic communication system of claim 2, wherein:

said first and second HB3-WDMs each include a narrow-band bi-directional WDM and a wide-band WDM; and b) said third and fourth HB3-WDMs each include a narrow-band uni-directional WDM and a wide-band WDM.

4. The fiber optic system of claim 3, wherein:

said first and second HB3-WDMs modulate a first signal of said first pair of bi-directional signals and said first signal of said second pair of bi-directional signals in a first direction;

said first and second HB3-WDMs modulate a second signal of said first pair of bi-directional signals in a second direction;

said third and fourth HB3-WDMs modulate a first signal of said third pair of bi-directional signals in said first direction; and, said third and fourth HB3-WDMs modulate a second signal of said third pair of bi-directional signals and said second signal of said second pair of bi-directional signals in said second direction.

5. The fiber optic system of claim 4, wherein, said first signals of said first and third pairs of bi-directional signals have a wavelength in a range centered about 1310 nm;

said second optic signals of said first and third pairs of signals have a wavelength in a range centered about 1550 nm; and, said first and second optic signals of said second pair of bi-directional signals have a wavelength in said range centered 1550 nm.

6. The fiber optic system of claim 5, wherein:

said first optic signals of said first and third pair of optic signals have a wavelength of 1310 nm;

said second optic signals of said first and third pairs of optic signals have a wavelength of 1557 nm; and, said first and second optic signals of said second pair of signals have a wavelength of 1533 nm.

7. The fiber optic communication system of claim 2, wherein:

said HB3-WDMs add a predetermined mount of attenuation to at least one signal of said at least three pairs of signals;

said first and second optic fibers add a predetermined amount of attenuation to at least one signal of said three pairs of signals; and, said HB3-WDM attenuation and said optic fiber attenuation tend to equalize signal strengths of said at least three pairs of signals.

8. The fiber optic communication system of claim 2, further comprising at least one spare communication system for communicating at least one pair of said at least three pairs of optic signals in the event of failure in said communication system.

9. The fiber optic communication system of claim 1, wherein said plurality of WDMs include wide band WDMs and narrow band WDMs.

10. The fiber optic communication system of claim 9, wherein each said pair of bi-directional signals is a transmit/receive pair of signals.

11. A method of modifying a multi-fiber communications system, comprising the steps of:

(1) switching a first pair of bi-directional signals from a first optic fiber to a back-up system;

(2) coupling a first new transmitter to a first end of said first optic fiber through a first hybrid bi-directional three color wave-division multiplexer (HB3-WDM) and coupling a first new receiver to a second end of said first optic fiber through a second HB3-WDM;

(3) switching said first pair of bi-directional signals from said back-up system to said first optic fiber;

(4) switching a second pair of bi-directional signals from a second optic fiber to a back-up system;

(5) coupling a second new receiver to a first end of said second optic fiber through a third HB3-WDM and coupling a second new transmitter to a second end of said second optic fiber through a fourth HB3-WDM; and, (6) switching said second set of bi-directional signals from said back up system to said second optic-fiber.

12. The method of claim 11, wherein:

said first and third HB3-WDMs are packaged together in a first modularized unit; and, said second and fourth HB3-WDMs are packaged together in a second modularized unit.

13. The method of claim 12, wherein steps (2) and (5) include the step of:

(a) removing and discarding at least one signal attenuator from said optic fiber.

14. The method of claim 11, further comprising the steps of:

(7) repeating steps (1) through (6) on remaining pairs of optic fibers of said communication system, one pair of fibers at a time.

15. A plug-and-play method of increasing a communication capability of a fiber optic communication system, without compromising backup spare capability, comprising the steps of:

(1) switching a pair of bi-directional signals from an optic fiber to a back-up system;

(2) disconnecting a first transmitter, a first receiver and a first multiplexing system coupling said first transmitter and said first receiver to a first end of said optic fiber, from said first end;

(3) disconnecting a second transmitter, a second receiver and a second multiplexing system coupling said second transmitter and said second receiver to a second end of said optic fiber, from said second end;

(4) removing said first and second multiplexing systems;

(5) installing a first and second hybrid three color wave-division-multiplexer (HB3-WDM) in place of said first and second multiplexing systems, respectively;

(6) installing a third transmitter near said first HB3-WDM;

(7) installing a third receiver near said second HB3-WDM;

(8) plugging an output of said first transmitter, an input of said first receiver, an output of said third transmitter and said first end of said optic fiber into a connector panel of said first HB3-WDM;

(9) plugging an output of said second transmitter, an input of said second receiver, an input of said third receiver and said second end of said optic fiber into a connector panel of said second HB3-WDM; and,

(10) switching said pair of bi-directional signals from said back-up system to said optic fiber.

16. The method of claim 15, wherein step (4) comprises the step of:

(a) removing and discarding a signal attenuation device from said optic fiber.

17. The method of claim 15, further comprising the steps of:

(11) transmitting a first signal of a first wavelength from said first transmitter and multiplexing said first signal onto said optic fiber through said first HB3-WDM;

(12) transmitting a second signal of a second wavelength from said second transmitter and multiplexing said second signal onto said optic fiber through said second HB3-WDM; and

(13) transmitting a third signal of a third wavelength from said third transmitter and multiplexing said third signal onto said optic fiber through said first HB3-WDM.

18. The method of claim 17, wherein:

said first signal has a wavelength in a range centered about 1310 nm;

said second signal has a wavelength centered about 1550 nm; and, said third signal has a wavelength centered about 1550 nm.

19. The method of claim 18, wherein:

said first signal has a wavelength of 1310 nm;

said second signal has a wavelength of 1557 nm; and, said third signal has a wavelength of 1553 nm.

20. The method of claim 17, wherein:

said first signal has a wavelength in a range centered about 1550 nm; said second signal has a wavelength centered about 1310 nm; and, said third signal has a wavelength centered about 1550 nm.

21. The method of claim 20, wherein:

said first signal has a wavelength of 1557 nm;

said second signal has a wavelength of 1310 nm; and, said third signal has a wavelength of 1553 nm.

22. A method of communicating at least three optic signals having different wavelengths over a single optic fiber, comprising the steps of:

(1) transmitting a first signal of a first wavelength from a first transmitter and multiplexing said first signal onto an optic fiber through a first HB3-WDM;

(2) transmitting a second signal of a second wavelength from a second transmitter and multiplexing said second signal onto said optic fiber through a second HB3-WDM; and (3) transmitting a third signal of a third wavelength from a third transmitter and multiplexing a third signal onto said optic fiber through said first HB3-WDM.

23. The method of claim 22, wherein:

said first signal has a wavelength in a range centered about 1310 nm;

said second signal has a wavelength centered about 1550 nm; and said third signal has a wavelength centered about 1550 nm.

24. The method of claim 23, wherein:

said first signal has a wavelength of 1310 nm;

said second signal has a wavelength of 1557 nm; and, said third signal has a wavelength of 1553 nm.

25. The method of claim 24, wherein:

said first signal travels in a first direction; and said second and third signal travels in a second direction, opposite said first direction.

26. The method of claim 24, wherein:

said first and third signals travel in a first direction; and said second signal travels in a second direction, opposite said first direction.

* * * * *